(12) United States Patent
Enos

(10) Patent No.: US 10,279,908 B2
(45) Date of Patent: May 7, 2019

(54) BORDER SURVEILLANCE AND TAGGING UNAUTHORIZED TARGETS USING DRONE AIRCRAFT AND SENSORS

(71) Applicant: Patrick Enos, Westminster, CA (US)

(72) Inventor: Patrick Enos, Westminster, CA (US)

(*) Notice: Subject to any disclaimer, the term of this patent is extended or adjusted under 35 U.S.C. 154(b) by 0 days.

(21) Appl. No.: 15/363,787

(22) Filed: Nov. 29, 2016

(65) Prior Publication Data

US 2018/0150087 A1 May 31, 2018

(51) Int. Cl.
| | |
|---|---|
| *B64C 39/02* | (2006.01) |
| *G05D 1/00* | (2006.01) |
| *G05D 1/12* | (2006.01) |
| *H04L 29/08* | (2006.01) |
| *G06Q 10/00* | (2012.01) |

(52) U.S. Cl.
CPC ......... *B64C 39/024* (2013.01); *G05D 1/0094* (2013.01); *G06Q 10/00* (2013.01); *H04L 67/12* (2013.01); *B64C 2201/12* (2013.01); *B64C 2201/146* (2013.01)

(58) Field of Classification Search
CPC ...... G05D 1/12; G05D 1/0011; B64C 39/024; B64C 2201/12; B64C 2201/146; H04L 67/12
See application file for complete search history.

(56) References Cited

U.S. PATENT DOCUMENTS

| | | | | |
|---|---|---|---|---|
| 2015/0371136 A1* | 12/2015 | Goossen | ................ | G06Q 10/06 706/46 |
| 2015/0379874 A1* | 12/2015 | Ubhi | ..................... | G01S 5/0027 701/3 |
| 2016/0341531 A1* | 11/2016 | Kotenkoff | ............... | F41H 7/005 |
| 2017/0131727 A1* | 5/2017 | Kurdi | ................... | G05D 1/0027 |

* cited by examiner

*Primary Examiner* — Alan D Hutchinson
(74) *Attorney, Agent, or Firm* — Fish & Richardson P.C.

(57) ABSTRACT

A tagging drone (TD) responds to a received query of availability initiated from a command and control drone (CCD) or command and control station (CCS), over a network, for investigating or tagging a designated target. The TD receives one or more dispatching instructions and heads to the designated target. The TD performs tagging of the designated target and determines whether the designated target was successfully tagged as a tagged target. The tagged target is tracked and tracking data is provided for recovery resource capture of the tagged target.

20 Claims, 8 Drawing Sheets

BORDER SURVEILLANCE AND TAGGING UNAUTHORIZED TARGETS USING DRONE AIRCRAFT AND SENSORS

BACKGROUND

A nation attempting to protect the integrity of their borders seeks efficient, cost-effective, and humane ways of accomplishing this task. Traditional methods for border security include building physical- or barrier-type structures (for example, walls, fences, watchtowers, anti-personnel mine fields, and the like), strategically placing manned resources along a border (for example, border patrol personnel, vehicles, detention facilities, and the like) to surveil and capture/hold targets (for example, people, vehicles, animals, and the like) illegally crossing the border, and to use a mixture of manned and unmanned (for example, cameras, movement sensors, and the like) resources to monitor the border and assist with target tracking and capture. The traditional methods are typically inefficient and cost prohibitive and can result in serious injuries or death to targets attempting to cross a designated border in an unauthorized manner.

SUMMARY

The present disclosure describes methods and systems, including computer-implemented methods, computer program products, and computer systems for border surveillance and tagging unauthorized targets using drone aircraft and sensors.

In an implementation, a tagging drone (TD) responds to a received query of availability initiated from a command and control drone (CCD) or command and control station (CCS) over a network for investigating or tagging a designated target. The TD receives one or more dispatching instructions and heads to the designated target. The TD performs tagging of the designated target and determines whether the designated target was successfully tagged as a tagged target. The tagged target is tracked and tracking data is provided for recovery resource capture of the tagged target.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, the described system and methodology permits efficient and safe capture of unauthorized targets that cross a defined border. As replaceable equipment is used to initially identify and mark unauthorized targets, human resources can be sent to capture the unauthorized target in a safe and planned manner without unnecessary risk to the human resources. Second, readily available core technologies make development and implementation easy and efficient. Third, the described system permits effective policing of a defined border at a fraction of the cost in resources when compared to erecting physical barriers. Fourth, the described system and methodology would provide a strong deterrent to unauthorized border crossing activities. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
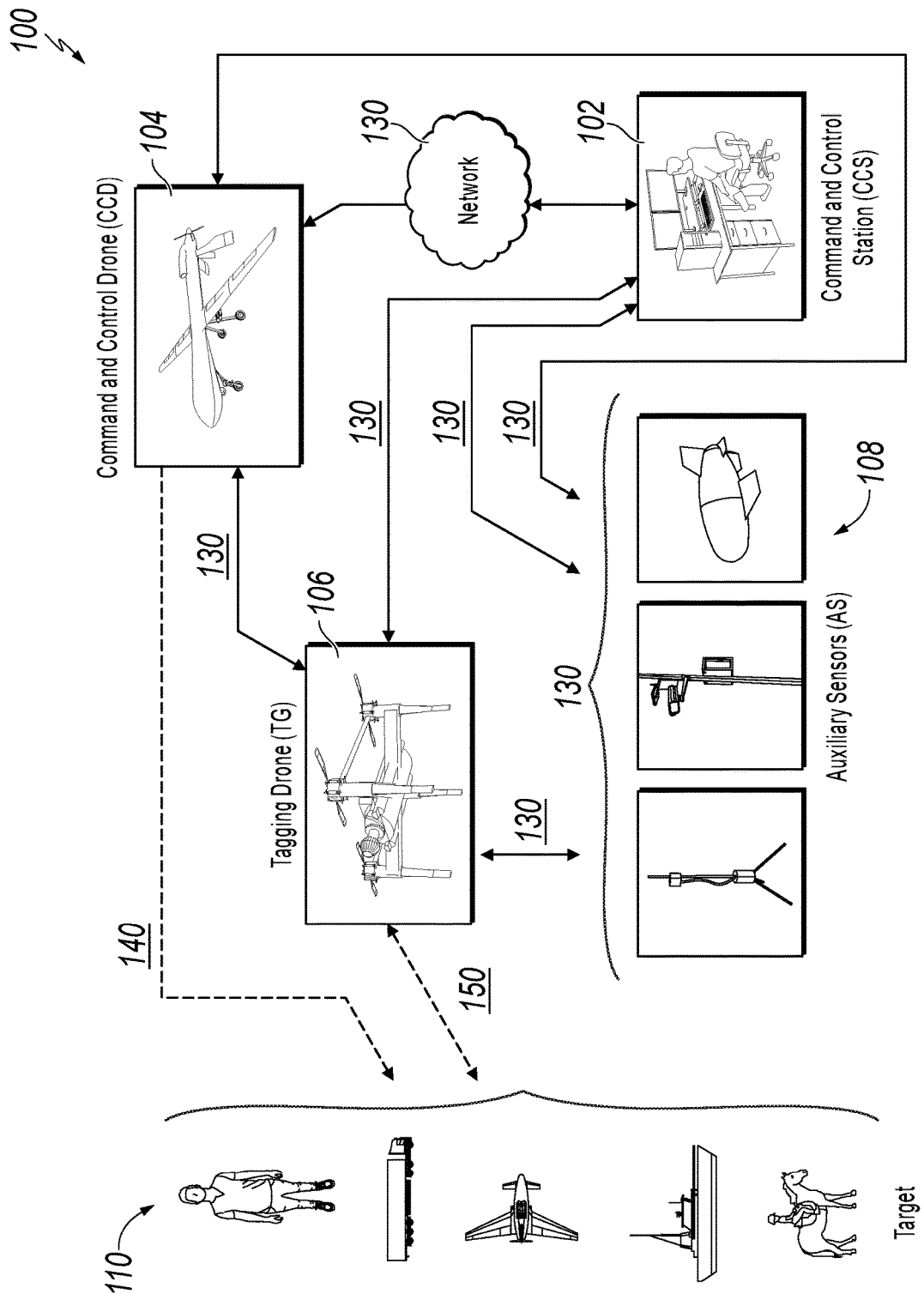
FIG. 1 is an illustration of an example distributed computing system for border surveillance and tagging unauthorized targets using drone aircraft and sensors, according to an implementation.

The following detailed description describes border surveillance and tagging unauthorized targets using drone aircraft and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

A nation attempting to protect the integrity of their borders seeks efficient, cost-effective, and humane ways of accomplishing this task. Traditional methods for border security include building physical- or barrier-type structures (for example, walls, fences, watchtowers, anti-personnel mine fields, and the like), strategically placing manned resources along a border (for example, border patrol personnel, vehicles, detention facilities, and the like) to surveil and capture/hold targets (for example, people, vehicles, animals, and the like) illegally crossing the border, and to use a mixture of manned and unmanned (for example, cameras, movement sensors, and the like) resources to monitor the border and assist with target tracking and capture. The traditional methods are typically inefficient and cost prohibitive and can result in serious injuries or death to targets attempting to cross a designated border in an unauthorized manner.

Borders are crossed illegally for many different reasons. Examples include human/sex-trafficking and the import/export of drugs, weapons, livestock, technology, and foodstuffs. Human/sex traffickers typically use ground-based vehicles (such as trucks or automobiles), aircraft, and boats to smuggle humans across borders. Ground-based vehicles, aircraft, and boats are also typically used to smuggle drugs, weapons, and the like across borders.

Aerial drone technology (hereinafter "drone") can be used to provide various functionalities for border security (for example, drones can be used to provide functionality such as audio/video recording; real-time monitoring, tracking, and tagging of targets; and the like) Drones are relatively inexpensive/can be used in large numbers, robust to various weather/atmospheric conditions, operable in various geographic environments, and allow human resources (such as border patrol and other law enforcement agents) to be used in a more efficient and precise manner while increasing overall human resource safety. While this description is focused on the use of aerial drones, those of ordinary skill in the art will understand that key described concepts could be extended to cover ground-based (for example, automated vehicles), fresh-water/marine-based (for example, automated surface and submersible vehicles), and space-based (for example, satellites) drone technologies. Accordingly, ground-, water-, and space-based drones are considered to be within the scope of this disclosure, whether used alone or in combination with aerial drone technology.

Drones can be configured to provide various lethal functionalities (for example, using bombs, missiles, firearms, and the like). However, this disclosure is focused on the use of non-lethal/non-injurious technologies for purposes of tagging/tracking of desired targets.

At a high-level and in typical implementations, this disclosure discusses the use of drones networked to human operators. Using the drones, human operators can determine that unauthorized targets are likely to, or have illegally crossed a determined border. Using the drones, the human operator can designate and tag the target with drone, track the tagged target, and direct resources to capture and process the target. In other implementations, one or more described functionalities normally performed by a human operator (for example, target detection, designation, and the like) can be automated and performed by computerized algorithms, artificial intelligence systems, machine-learning systems, and the like. Typical implementations, permit human operators to intervene at any point to override automated determinations or to permit automated systems to take over manually-performed functionality.

FIG. 1 is an illustration of an example distributed computing system 100 for border surveillance and tagging unauthorized targets using drones, according to an implementation. System 100 includes a command and control station (CCS) 102, command and control drone (CCD) 104, tagging drone (TD) 106, and auxiliary sensors (AS) 108 networked using at least network 130. Also illustrated are targets 110 (for example, people, ground-based vehicles (such as trucks, automobiles, and motorcycles), aircraft, boats, animals (for example, with human riders or those used to carry contraband), and the like. As will be understood by those of ordinary skill in the art, the illustrated system 100 is only one of a myriad of possible system configurations for performing the described functionality. Other configurations consistent with this disclosure are considered to be within the scope of this disclosure. Likewise, illustrated components are presented as examples for further understanding and should not be considered limiting in any way. While each connection between the various components (for example, between the CCS 102, CCD 104, TD 106, and AS 108) can use the same network (for example, network 130 as illustrated), in other implementations, network 130 can include a combination of different networks working together. For example, the CCS 102 and CCD 104 can use a particular network to communicate with each other, while the CCD 104 and TD 106 can communicate on a different network. In some implementations, multiple networks can be arranged into configurations of prime/sub-networks that work together to provide system 100 functionality. Illustrated components are configured to be uniquely identified within system 100 (for example, each drone/sensor can have a unique identifier within the network) and can also be configured to permit dynamic switching between networks, formation of new networks, closing of networks, and the like, as needed for greater efficiency and other purposes (for example, to provide greater security, higher bandwidth needs, more efficient communication, and the like). Components of system 100 (for example, uniquely identified drones) can respond to queries from system 100 (for example, from the CCS 102 and CCD 104) with identification, capabilities, mission readiness, range capability, available tagging projectile types, and the like.

One or more of the illustrated network connections can also be encrypted to prevent hacking, misdirection, jamming, damage to equipment, and the like.

In typical configurations, each illustrated component of system 100 can be configured to communicate using one or more communication methods. As an example, the network 130 connection between the CCS 102 and the CCD 104 can be an encrypted radio frequency connection, while a network connection between the CCD 104 and TD 106 can be an optical (for example, a laser), line-of-sight network connection for security purposes. In the case of a failure of a preferred communication method (for example, a laser emitter/receiver) on the CCD 104, components can failover to an alternate communication method (for example, the CCD 104 can communicate with the TD 106 using radio frequency communications). Communication methods can also be altered based on distance between components (for example, between a CCD 104 and TD 106 requiring a non-line-of-sight radio frequency connection or different frequency radio frequency connection with greater broadcast distance), atmospheric conditions (for example, rain, snow, blowing sand, and the like can interfere with optical connection methods and require a switch-over to a radio frequency connection), security (for example, optical connections are more secure than radio frequency communications), and other causes consistent with this disclosure. In typical implementations, the CCS 102 can be used to alter communication methods between various system 100 components (for example, a CCS 102 operator can receive a notification from a system 100 component that an alternative communication method is preferred based on a provided rationale, such as mechanical failure, atmospheric conditions, and the like) or the various system components can automatically adjust their communication methods to optimize overall functionality. Any communication method between components that is consistent with this disclosure is considered to be within the scope of this disclosure (for example, radio frequency, optical, microwave, WIFI, satellite relay, and the like).

In typical implementations, illustrated components of system 100 can be configured to communicate with one or more other components of system 100, even if the communication is not to directly provide information or instructions to the other components. In this manner, system 100 is made more robust in case of a failover or other abnormal situations, as each component can be aware of the status/condition of other components of system 100 and can be used to mitigate a failover situation, act as a relay between different components, and the like. For example, if a CCD 104 loses contact with a particular TD 106 being sent to tag a target 110 (for example, due to mechanical failure, low fuel/charge status, the particular TD 106 has been targeted and hit by a firearm associated with the target 110, and the like), one or more nearby TDs 106 can communicate availability to the CCD 104, activate, and move toward the target 110 to complete the desired tagging for the particular TD 106 that was unable to complete its tagging instructions. Similarly, if conditions related to a tagging operation dynamically change (for example, a human target enters a ground-based vehicle and leaves an area at higher than expected speed), a different TD 106 (for example, with a longer-range gasoline engine providing higher air speed) can be called into active service to complete a tagging mission of the ground-based vehicle instead of the original human target.

At a high-level, the CCS 102 is configured to typically provide functionality related to positive flight control of CCDs 104, TDs 106, and AS 108 (for example, a balloon-type AS 108), and operation, programming, configuration, and other functionalityrelated to the components of system 100. For example, the CCS 102 can, among other things, be used to operate one or more CCDs 104, TDs 106, and AS 108 components, designate detected targets 110, track designated targets 110, communicate with border patrol/law enforcement officers, and the like. Other functions performed by the CCS 102 that are consistent with this disclosure are considered to be within the scope of this disclosure.

At a high-level, the CCD 104 is typically configured as a high-altitude, long-loitering, stand-off, scanning, communication, and command and control component in system 100. In typical implementations, CCD 104 can be flown at extremely high altitudes to avoid detection by targets 110 and to afford the ability to scan large portions of the earth, water, air, and the like, for long periods of time. For example, drone operators stationed in the CCS 102 can use a CCD 104 configured in a patrol pattern (for example to repeatedly circle or fly a designated pattern across the surface of the earth) to relay commands to TD 106 and AS 108 components and to receive data from the TD 106, AS 108, and other CCDs 104 or CCSs 102. The CCD 104 can also be used to scan (for example, optical, radar, sonar, microwave, and the like) the surface of the earth, water, and air for potential targets 110 that may cross a designated border (illustrated as dashed line 140 in FIG. 1). In some implementations, more than one CCD 104 can be used to extend the scanning range of system 100. In these implementations, one or more CCDs 104 can be used as a relay between a CCS 102 and other CCDs 104. In other implementations, separate communications can be used to communicate with each CCD 104 (for example, radio towers, satellite communications, and the like).

At a high-level, a TD 106 is used to provide local surveillance, tagging, communication, and command and control functionality in system 100. Each TD 106 is used to locate, target, and tag designated targets 110 (illustrated as dashed line 150 in FIG. 1). Additional functionality can also include after-tagging tracking, surveillance, and the like. For example, a TD 106 can be instructed by a CCD 104 to activate, intercept, and locate and tag a particular designated target 110. After tagging, the TD 106 can keep track of the tagged target 110 and report tracking data to a CCD 104 or a CCS 102. In typical implementations, TDs 106 can be manually operated by the CCS 102 (for example, either directly or relayed through one or more CCDs 104), in an automated manner using software (for example, using machine learning, artificial intelligence, and the like), or a combination of the two.

AS 108 can include, among other things, ground-, air-, or water-based sensors to provide additional data to a CCS 102, CCD 104, and a TD 106. Examples of AS 108s can include elevated position cameras (for example, passive or active), air-based sensors (such as balloons, blimps, and the like), and other sensors (such as wires, audio, visual, infrared, radar, sonar, movement, vibration, seismic, laser, and the like) used to detect movement, location, entry/exit into or across a defined boundary/area, and the like. In typical implementations, data detected by one or more AS 108 can cause a CCS 102, CCD 104, or TD 106 to focus more closely on the AS 108 data to determine its relevance and whether the AS 108 data indicates a target 110. A CCS 102, CCD 104, or TD 106 can also trigger local AS 108s, if desired, to assist with surveillance, targeting, tagging, communication, and the like.

Figure 2:
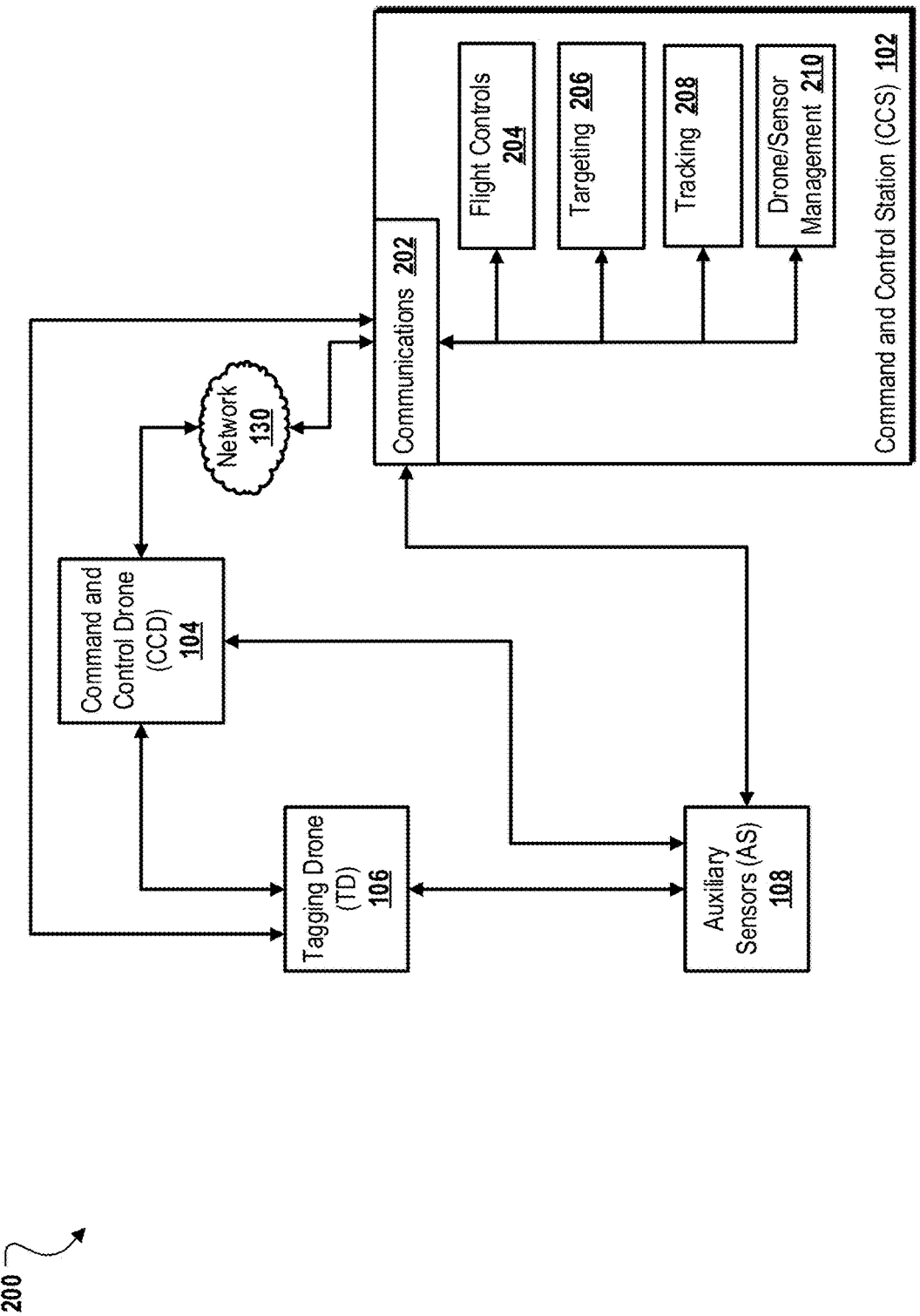
FIG. 2 is a block diagram of components of an example command and control station (CCS) as part of the example system for border surveillance and tagging unauthorized targets using the drone aircraft and sensors of FIG. 1, according to an implementation.

FIG. 2 is a block diagram 200 of components of an example command and control station (CCS) 102 as part of the example system 100 for border surveillance and tagging unauthorized targets using the drone aircraft and sensors of FIG. 1, according to an implementation. CCS 102 includes communications 202, flight controls 204, targeting 206, tracking 208, and drone management 210. The CCS 102 can include one or more computers (for example, a computer as described in FIG. 8). As will be understood by those of ordinary skill in the art, the illustrated CCS 102 is only one of a myriad of possible configurations for a CCS 102 and for performing the described functionality of the CCS 102. Other configurations consistent with this disclosure are considered to be within the scope of this disclosure. Likewise, illustrated components of the CCS 102 are presented as examples to further understanding and should not be considered limiting in any way.

Communications 202 is used by the CCS 102 for communicating with other components in system 100 or other systems 100 (not illustrated). Communications 202 is connected to a network (for example, network 130 or other connected networks as described in this disclosure). Generally, communications 202 comprises logic encoded in software or hardware (or a combination of software and hardware). More specifically, communications 202 may include hardware providing various communication methods (for example, radio frequency, optical, microwave, WIFI, satellite relay, and the like) and software supporting one or more communication protocols associated with the communication methods, to communicate physical signals into and out of the CCS 102.

Flight controls 204 include hardware and software (for example, visual displays, one or more flight/tagging firing control sticks, simulation software, visual processing software, and the like) providing real-time positive flight control functionality for one or more CCDs 104 and TDs 106. In typical implementations, the flight controls 204 can be multi-purposed to control other functionality related to the CCS 102 (for example, targeting 206 and tracking 208 functionality) and system 100 (for example, activate/deactivate one or more AS 108s and the like).

Targeting 206 provides real-time functionality to identify, designate, and lock onto one or more targets 110. Targeting 206 functionality can provide ballistic solutions, threat warnings, visual displays/cues, audio indicators/cues, and the like to allow a CCS 102 operator to target one or more targets 110. Targeting 206 can be integrated with similar functionality in one or more CCDs 104 and TDs 106 to permit a CCS 102 operator to target a particular target 110 using a CCD 104 or TD 106. Additionally, targeting 206 can make use of data from AS 108s to refine calculations for targeting 206 use.

Tracking 208 provides real-time functionality to track an identified target 110. In some implementations, tracking 208 data can be provided to another CCS 102, the CCD 104, or the TD 106, for use in tracking the identified target 110. Tracking 208 can also provide, for example, visual data/cues (such as target tracks, speed, heading, and the like) and tracking projections (for example projected position fans based on heading, speed, weather conditions, and the like) and audio data/cues. Additionally, tracking 208 can track border patrol and other law enforcement sent to capture a particular target 110. In case the particular target 110 attempts to escape capture, the tracking 208 can provide real-time projections/suggestions for law enforcement to assist with capture of the particular target (for example, suggest heading and speed changes, easier terrain to traverse, and the like). Tracking 208 can be integrated with similar functionality in one or more CCSs 102, CCDs 104 and TDs 106. Additionally, tracking can make use of data from AS 108s to refine calculations for tracking use.

Drone/sensor management 210 provides real-time functionality regarding the health/status of one or more drone aircraft and sensors (such as the CCD 104, TD 106, or AS 108) in system 100. For example, drone/sensor management 210 can provide drone mechanical, charge/fuel, lubricant, computer, communications, security, and sensor status or AS 108 mechanicals, charge, communication, security, and computer status. Drone/sensor management 210 can provide visual/audio data/cues using a visual display if any anomalous health/status data is detected with regard to a CCD 104, TD 106, or AS 108. If anomalies are detected, the affected equipment can be removed from service by operators in the CCS 102 or by automated CCS 102 functionality that can designate appropriate equipment to assume assigned duties for the affected equipment. Drone/sensor management 210 can also provide functionality related to querying/selecting drones (for example, TDs 106 to tag a particular target 110) and swarm-type functionality with respect to one or more drones associated with system 100.

Figure 3:
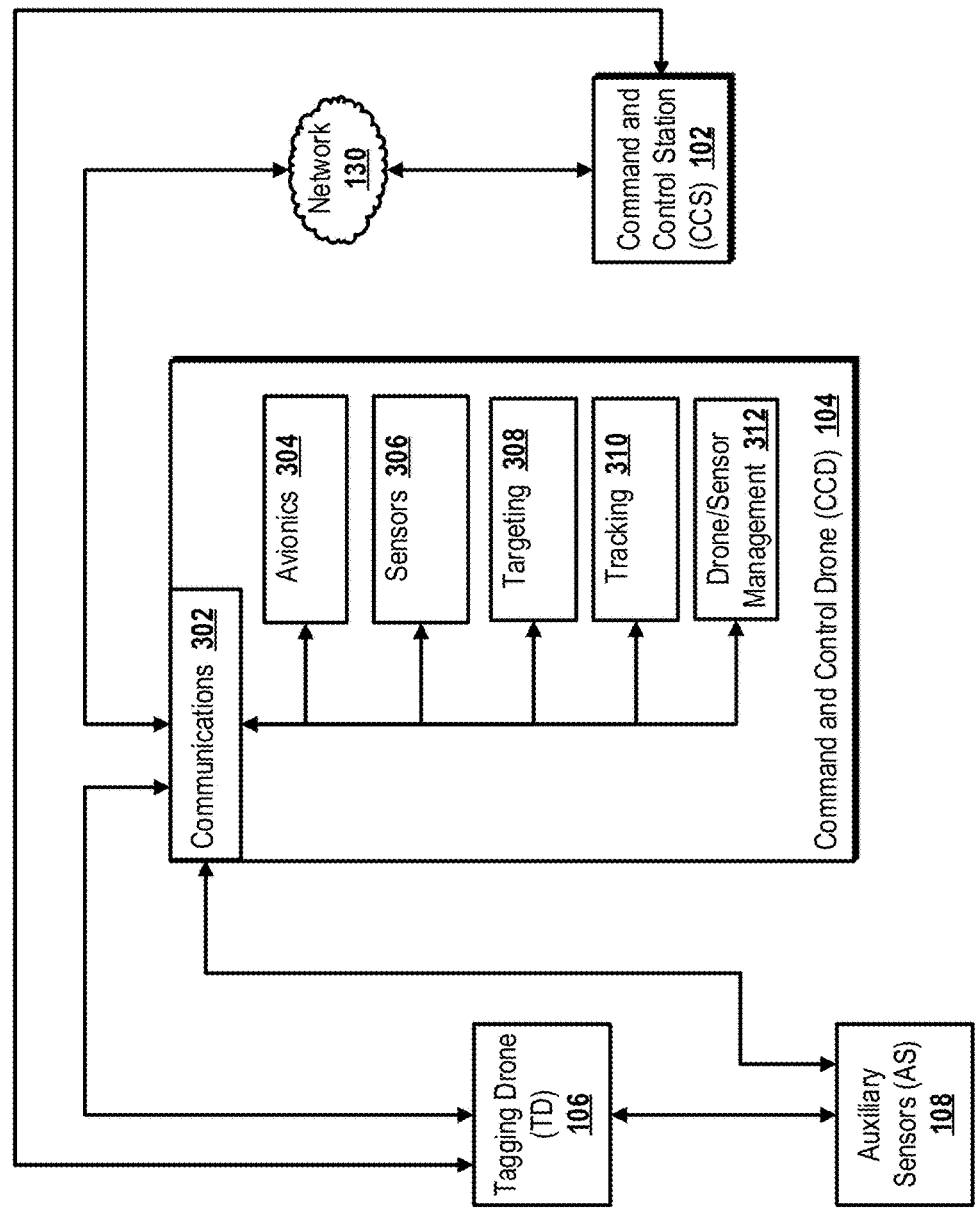
FIG. 3 is a block diagram of components of an example command and control drone (CCD) as part of the example system for border surveillance and tagging unauthorized targets using the drone aircraft and sensors of FIG. 1, according to an implementation.

FIG. 3 is a block diagram 300 of components of an example command and control drone (CCD) 104 as part of the example system 100 for border surveillance and tagging unauthorized targets using the drone aircraft and sensors of FIG. 1, according to an implementation. CCD 104 includes communications 302, avionics 304, sensors 306, targeting 308, tracking 310, and drone/sensor management 312. The CCD 104 can include one or more computers (for example, a computer as described in FIG. 8). As will be understood by those of ordinary skill in the art, the illustrated CCD 104 is only one of a myriad of possible configurations of a CCD 104 and for performing the described functionality of the CCD 104. Other configurations consistent with this disclosure are considered to be within the scope of this disclosure. Likewise, illustrated components of the CCD 104 are presented as examples for further understanding and should not be considered limiting in any way.

Communications 302 is used by the CCD 104 for communicating with other components in system 100 or other systems 100 (not illustrated). Communications 302 is connected to a network (for example, network 130 or other connected networks as described in this disclosure). Generally, communications 302 comprises logic encoded in software or hardware (or a combination of software and hardware). More specifically, communications 302 may include hardware providing various communication methods (for example, radio frequency, optical, microwave, WIFI, satellite relay, and the like) and software supporting one or more communication protocols associated with the communication methods to communicate physical signals into and out of the CCD 104.

Avionics 304 includes hardware and software permitting the real-time automatic or remote manual operation of the CCD 104. In some implementations, avionics 304 can include machine learning or artificial intelligence systems to provide intelligent functionality related to the various features/functions provided by the CCD 104. For example, a machine learning system can maximize the efficiency of flight control, use of charge/fuel, terrain/hazard avoidance, and the like. In typical implementations, the CCD 104 can be controlled by a CCS 102, avionics 304 (even as part of another CCD 104, TD 106, or a combination of the CCS 102, avionics 304, and TD 106.

In typical implementations, the CCD 104 is configured with various sensors 306. Sensors 306 can include one or more instruments (for example, emitters, receivers, detectors, and the like) for visual, laser, infra-red (IR)/ultra-violet (UV)/other light frequency, radio-frequency, radioactivity, phosphorescent dye (visible/invisible), GPS, environmental, accelerometer, gyroscopic, compass, laser/radar altimeter, object avoidance, radar, sonar, and other data. Various CCD 104 configurations can vary depending on particular purposes/uses for a particular CCD 104. Sensors 306 can be can be passive, active, or a combination of passive or active. The data from sensors 306 can be used by other functionality associated with the CCD 104 and other components of system 100 (for example, the CCS 102 and a TD 106).

Targeting 308 provides real-time functionality to identify, designate, and lock onto one or more targets 110. For example, the CCD 104 can use optical, laser, radar, sonar, or infrared targeting to designate a particular target 110. Targeting 308 functionality can provide ballistic solutions, threat warnings, visual displays/cues, audio indicators/cues, and the like, to allow a CCD 104 operator to target one or more targets 110. In some implementations, targeting 308 can include machine learning or artificial intelligence functionality to permit intelligent targeting by the CCD 104 and notification of one or more components of system 100 (for example, the CCS 102 or a TD 106). In some implementations, targeting 308 can be integrated with similar functionality in one or more other CCDs 104 or TDs 106. For example, the CCD 104 can receive and process targeting data (or other data) received from another CCD 104 or TD 106 to provide targeting functionality or to enhance existing targeting functionality/results. Additionally, targeting 308 can make use of data from AS 108s to refine calculations for targeting use.

Tracking 310 provides real-time functionality to track an identified target 110. In some implementations, tracking 310 data can be provided to either the CCS 102, another CCD 104, or the TD 106 for use in tracking the identified target 110. Similar to tracking functionality associated with the CCS 102, tracking 310 can also provide, for example, visual data/cues (such as target tracks, speed, heading, and the like) and tracking projections (for example projected positions based on heading, speed, weather conditions, and the like) and audio data/cues. Additionally, tracking 310 can track border patrol and other law enforcement sent to capture a particular target 110. In case the particular target 110 attempts to escape capture, the tracking 310 can provide real-time projections/suggestions for law enforcement to assist with capture of the particular target (for example, suggest heading and speed changes, easier terrain to traverse, and the like). Tracking 310 can be integrated with similar functionality in one or more CCSs 102, CCDs 104, and TDs 106. Additionally, tracking can make use of data from AS 108s to refine calculations for tracking use.

Drone/sensor management 312 provides real-time functionality regarding managing health/status of the CCD 104 and drones (for example, other CCDs 104 and TDs 106)/AS 108s associated with the CCD 104. For example, drone/sensor management 312 can monitor and manage mechanical, charge/fuel, lubricant, computer, communications, security, and sensor status for CCDs 104/TDs 106 or AS 108 mechanicals, charge, communication, security, and computer status. For example, the CCD 104 can be in control of one or more TDs 106 to tag a target 110 and monitor the status of each TD 106 for optimum performance. If a particular TD 106 is in less-than-optimum operating condition, drone/sensor management 312 can provide instructions to deactivate the particular TD 106 and activate another TD 106 for use by system 100. The drone/sensor management 312 can also report status data to the CCS 102 or other components of system 100 to permit appropriate mitigating actions to be taken by other components of system 100. For example, drone/sensor management 312 can provide data to the CCS 102 if any anomalous health/status data is detected with regard to the CCD 104 or other components managed by the CCD 104. If anomalies are detected, the affected equipment can be removed from service by operators in the CCD 104 or by automated functionality (for example, in the CCD 104 or, as described above, in the CCS 102) that can designate appropriate equipment to assume assigned duties for the affected equipment. Drone/sensor management 312 can also provide functionality related to querying/selecting drones (for example, TDs 106 to tag a particular target 110) and swarm-type functionality with respect to one or more drones associated with system 100.

Figure 4:
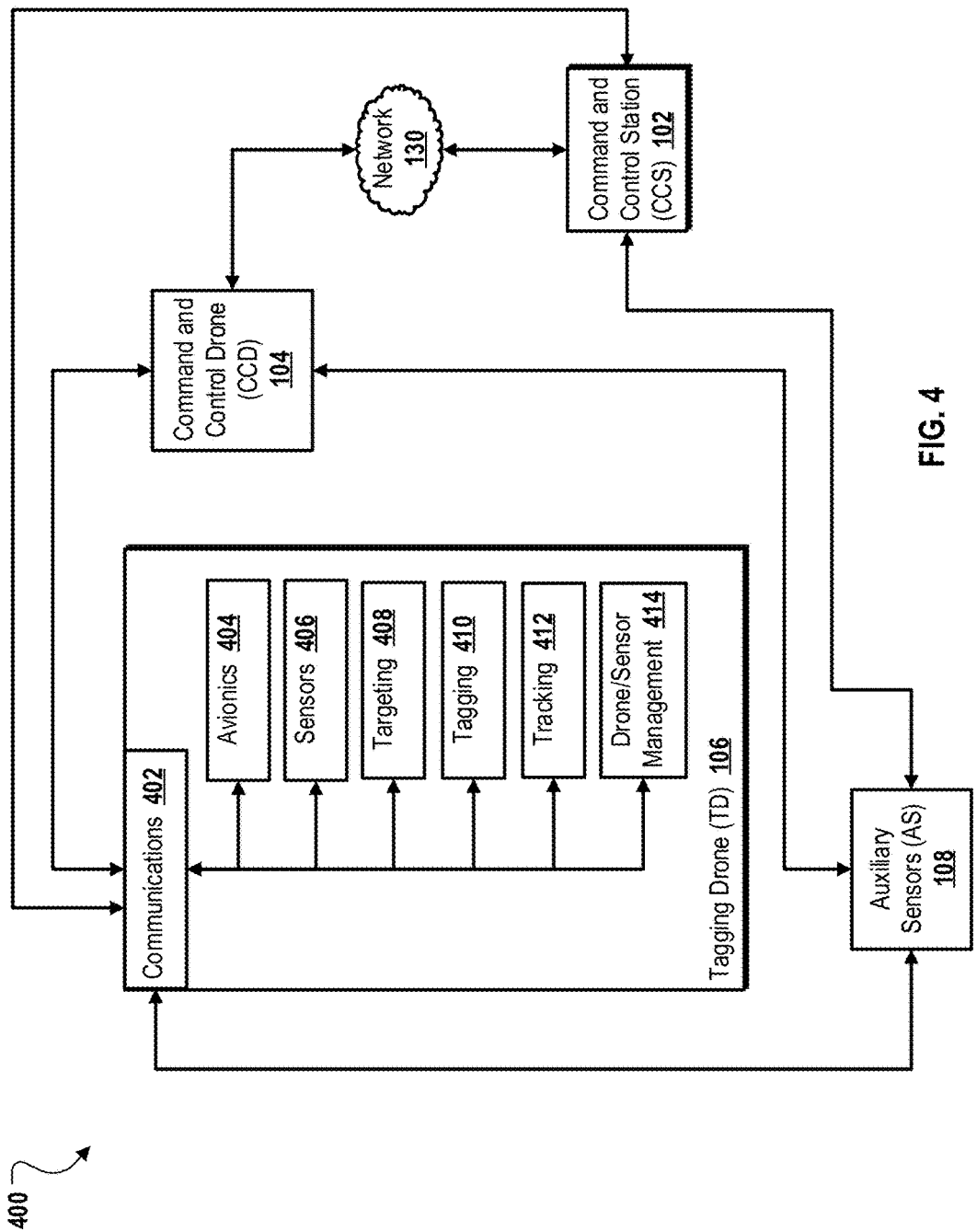
FIG. 4 is a block diagram of components of an example tagging drone (TD) as part of the example system for border surveillance and tagging unauthorized targets using the drone aircraft and sensors of FIG. 1, according to an implementation.

FIG. 4 is a block diagram 400 of components of an example tagging drone (TD) 106 as part of the example system 100 for border surveillance and tagging unauthorized targets using the drone aircraft and sensors of FIG. 1, according to an implementation. TD 106 includes communications 402, avionics 404, sensors 406, targeting 408, tagging 410, tracking 412, and drone/sensor management 414. The TD 106 can include one or more computers (for example, a computer as described in FIG. 8). As will be understood by those of ordinary skill in the art, the illustrated TD 106 is only one of a myriad of possible configurations of a TD 106 and for performing the described functionality of the TD 106. Other configurations consistent with this disclosure are considered to be within the scope of this disclosure. Likewise, illustrated components of the TD 106 are presented as examples for further understanding and should not be considered limiting in any way.

Communications 402 is used by the TD 106 for communicating with other components in system 100 or other systems 100 (not illustrated). Communications 402 is connected to a network (for example, network 130 or other connected networks as described in this disclosure). Generally, communications 402 comprises logic encoded in software or hardware (or a combination of software and hardware). More specifically, communications 402 may include hardware providing various communication methods (for example, radio frequency, optical, microwave, WIFI, satellite relay, and the like) and software supporting one or more communication protocols associated with the communication methods, to communicate physical signals into and out of the TD 106.

Avionics 404 includes hardware and software permitting the real-time automatic or remote manual operation of the TD 106. In some implementations, avionics 404 can include machine learning or artificial intelligence systems to provide intelligent functionality related to the various features/functions provided by the TD 106. For example, a machine learning system can maximize the efficiency of flight control, use of charge/fuel, terrain/hazard avoidance, tagging functionality (described in more detail below), and the like. In typical implementations, the TD 106 can be controlled by a CCS 102, CCD 104, avionics 404 (even as part of another TD 106), or a combination of the CCS 102, CCD 104, and avionics 404.

In typical implementations, the TD 106 is configured with various sensors 406. Sensors 406 can include one or more instruments (for example, emitters, receivers, detectors, and the like) for visual, laser, infra-red (IR)/ultra-violet (UV)/other light frequency, radio-frequency, radioactivity, phosphorescent dye (visible/invisible), GPS, environmental, accelerometer, gyroscopic, compass, laser/radar altimeter, object avoidance, radar, sonar, and other data. Various TD 106 configurations can vary depending on particular purposes/uses for a particular TD 106. Sensors 406 can be can be passive, active, or a combination of passive and active. The data from sensors 406 can be used by other functionality associated with the TD 106 and other components of system 100 (for example, the CCS 102 and a CCD 104).

Targeting 408 provides real-time functionality to identify, designate, and lock onto one or more targets 110. For example, the TD 106 can use optical, laser, radar, sonar, or infrared targeting to designate a particular target 110. Targeting 408 functionality can provide ballistic solutions, threat warnings, visual displays/cues, audio indicators/cues, and the like to allow a TD 106 operator to target one or more targets 110. In some implementations, targeting 408 can include machine learning or artificial intelligence functionality to permit intelligent targeting by the TD 106 and notification of one or more components of system 100 (for example, the CCS 102, CCD 104, or a TD 106). In some implementations, targeting 408 can be integrated with similar functionality in one or more other CCSs 102, CCDs 104 or TDs 106. For example, the TD 106 can receive and process targeting data (or other data) received from another TD 106 or TD 106 to provide targeting functionality or to enhance existing targeting functionality/results. Additionally, targeting 408 can make use of data from AS 108s to refine calculations for targeting use.

Tagging 410 provides real-time functionality to lock onto, and manually (for example by an operator in the CCS 102) or automatically (for example using machine learning or artificial intelligence routines) tag an identified target 110 using non-lethal tagging methods. Tagging 410 includes hardware and software to provide the real-time tagging functionality. Tagging methods can include, for example, low-level radioactive, phosphorescent, colored, etc. indelible paints/dyes/substances (similar to a "paint ball"-type weapon) that can be used to "tag" or mark the identified target. For example, a TD 106 can be configured with a spring-loaded, compressed gas-based, or explosive-propelled automatic or semi-automatic projectile launcher (not illustrated) that can be used to tag the identified target 110 with one or multiple projectiles. Some implementations, can tag a target 110 using a spray or fog-type dispersal system for liquids or powders. A TD 106 can be controlled (by elements of system 100) to target, track, and tag the identified target 110. Once the identified target 110 has been tagged, system 100 can be used to track the tagged target 110 using, for example, sensors on the CCD 104, TD 106, and AS 108s that are configured to detect the substance used for tagging (radiation, particular dyes/paints/colors that fluoresce under particular light frequencies, etc.). As described above, while this disclosure is focused on the use of non-lethal/non-injurious technologies for purposes of tagging/tracking of desired targets 110, in particular implementations, tagging 410 can include lethal functionalities (for example, using bombs, missiles, firearms, and the like). The lethal functionalities can be leveraged in the case of the need to protect law enforcement or other "innocents" placed in harm's way through illegal activity (for example, human/sex traffickers, and the like where elimination of witnesses/evidence is attempted once their activities are detected). In some implementations, tagging functionality can be performed by AS 108s under the direction of components of system 100 (for example, in one possible implementation, a TD 106 could instruct a local tagging system mounted near a trail to acquire and tag a target 110 walking along the trail).

Tracking 412 provides real-time functionality to track an identified target 110. In some implementations, tracking 412 data can be provided to either the CCS 102, CCD 104, or another TD 106 for use in tracking the identified target 110. Similar to tracking functionality associated with the CCS 102 and CCD 104, tracking 412 can also provide, for example, visual data/cues (such as target tracks, speed, heading, and the like) and tracking projections (for example projected position fans based on heading, speed, weather conditions, and the like) and audio data/cues. Additionally, tracking 412 can track border patrol and other law enforcement sent to capture a particular target 110. In case the particular target 110 attempts to escape capture, the tracking 412 can provide real-time projections/suggestions for law enforcement to assist with capture of the particular target (for example, suggest heading and speed changes, easier terrain to traverse, and the like). Tracking 412 can be integrated with similar functionality in one or more CCSs 102, CCDs 104, and TDs 106. Additionally, tracking can make use of data from AS 108s to refine calculations for tracking use.

Drone/sensor management 414 provides real-time functionality regarding managing health/status of the TD 106 and drones (for example, other CCDs 104 and TDs 106)/AS 108s associated with the TD 106. For example, drone/sensor management 414 can monitor and manage mechanical, charge/fuel, lubricant, computer, communications, security, and sensor status for CCDs 104/TDs 106 or AS 108 mechanicals, charge, communication, security, and computer status. For example, the TD 106 can be in control of one or more other TDs 106 (that is, in a swarming-type configuration) to tag a target 110 and monitor the status (as a swarm-leader) of each other TD 106 for optimum performance. If a particular TD 106 is in less-than-optimum operating condition, drone/sensor management 414 can provide instructions to deactivate the particular TD 106 and activate another TD 106 for use by system 100, or to request replacement (for example, from the CCS 102 or CCD 104) of the particular TD 106. The drone/sensor management 414 can also report status data to the CCS 102, CCD 104, or other components of system 100 to permit appropriate mitigating actions to be taken by other components of system 100. For example, drone/sensor management 414 can provide data to the CCS 102 or CCD 104 if any anomalous health/status data is detected with regard to the TD 106 or other components managed by the TD 106. If anomalies are detected, the affected equipment can be removed from service by operators in the CCS 102 or by automated functionality (for example, in the CCD 104, TD 106, or, as described above, in the CCS 102) that can designate appropriate equipment (for example, a replacement TD 106) to assume assigned duties for the affected equipment. Drone/sensor management 414 can also provide functionality related to querying/selecting various drones (for example, TDs 106 to track/tag a particular target 110) and swarm-type functionality operations with respect to one or more TDs 106 associated with system 100. In the case of an unsuccessful tagging effort, drone/sensor management 414 or similar functionality in the CCS 102, CCD 104, can be used to re-attempt tagging of a target 110 with the same, other, or multiple TDs 106.

One or more TDs 106 can be used to provide a close-up/local view of a potential target. If the target is determined to be of no interest, authorized, or otherwise not in need of tagging, system 100 can cancel the targeting operation (for example, a CCS 102 operator or automated determination by various components of system 100).

In some implementations, TD 106s are envisioned to be configured to be capable of being:
1. Stationed at various geographic locations (for example, on the ground, on hills/mountains, in caves, near camouflaging plants, trees, and the like) in determined or random locations (for example, locations could be determined by machine learning or artificial intelligence functionalities of system 100) until needed. For example, TDs 106 can be configured to land and "park"/"sleep" while waiting for a query from some component of system 100. In some implementations, a TD 106 could charge a solar battery using solar cells.
2. Stationed at a designated enclosure to keep drones secure (for example, small fenced enclosures/platforms, etc. The dedicated enclosures could be alarmed with security sensors (including, for example, AS 108s) to detect tampering and to allow law enforcement to intervene.
3. Stationed on mobile vehicles (for example, ground-, air-, or water-based) such as trucks, balloons, aircraft, other drones, and the like) and launched when needed.

In some implementations, TD 106 station locations can be positioned near known, suspected, or projected (for example, using machine learning or artificial intelligence) trafficking or travel routes. In some implementations, some station locations can change at random timeframes so drone locations are not known or extremely difficult to determine to border crossers. For example, a drone "fleet" can launch and randomly re-disperse to different locations every day at some determined or random timeframe, based on weather patterns, shifts in border crossing efforts, or using other data consistent with this disclosure. In some implementations, a TD 106 can be configured to operate as an AS 108 while in a parked/sleep state. TD 106s can also be configured to routinely activate, launch, and scan an area for potential targets before returning to a parked/sleep state.

Drones (particularly TD 106s) may be configured for either generic or specialized purposes. Some drones can have "cookie-cutter"-type configurations and be used for multiple purposes. For specialized configurations, drones can be configured to be of different sizes, with different equipment, for different weather, temperature, and atmospheric conditions, for different speed needs (for example, depending on target 110 types—people, automobiles, planes, boats, animals, etc.), loiter time/range (for example, battery or gasoline powered), altitude capabilities, types of tagging needed (for example, dye, radioactive, paint, spray, etc.), etc.

In some implementations, drones (particularly TD 106s) can be configured to be weather proof (for example, sun, rain, snow, ice) and to handle other atmospheric conditions (for example, dust, sand, insects, and the like). In some implementations, drones can maneuver themselves into locations (defined man-made enclosures, near rocks, into small caves, and the like) to protect themselves from weather, sand, and the like. The drones can also be hardened for greater survivability (for example, from gunfire, animals, and the like). Some drones may be equipped with defensive capabilities, such as electric shock to deter people and animals from tampering with the drones. Drones can also broadcast an alarm to system 100 if tampering or damage is happening or projected to occur. Drones can also report particular mechanical issues to system 100 to allow personnel to pick them up for repair or renovation, if needed.

As stated above, TD 106s can also be configured with "swarm"-type functionality to tag targets 110. A TD 106 can be designated as a swarm leader (that can be manually or automatically operated) that can be dynamically changed if necessary (for example, the lead is shot down or suffers mechanical failure, a different TD 106 possesses better equipment/specifications, the lead TD 106 is running low on charge/fuel, and the like). A TD 106 swarm can be used to confuse or misdirect a target 110 (for example, by evasively weaving, performing seemingly random movements, etc.) so that the target 110 is unaware of which TD 106 is the designated tagging drone. Once tagging is complete, TD 106s can quickly evacuate the area for protection or leave one or more TD 106s operational nearby to surveil the target 110 and provide additional data for system 100.

Drones in system 100 can also be configured to identify "friendly" people, vehicles, and the like, using identification-friend-foe (IFF) transponders, visual patterns, radio broadcasts, etc. Operators or automated routines can choose to ignore a particular target if identified as "friendly." System 100 can also be configured with thresholds, visual identification, and the like to help avoid normal animals in the environment (for example, wild horses, deer, etc.), but to permit targeting of people, vehicles, and the like moving in the same environment.

Figure 5:
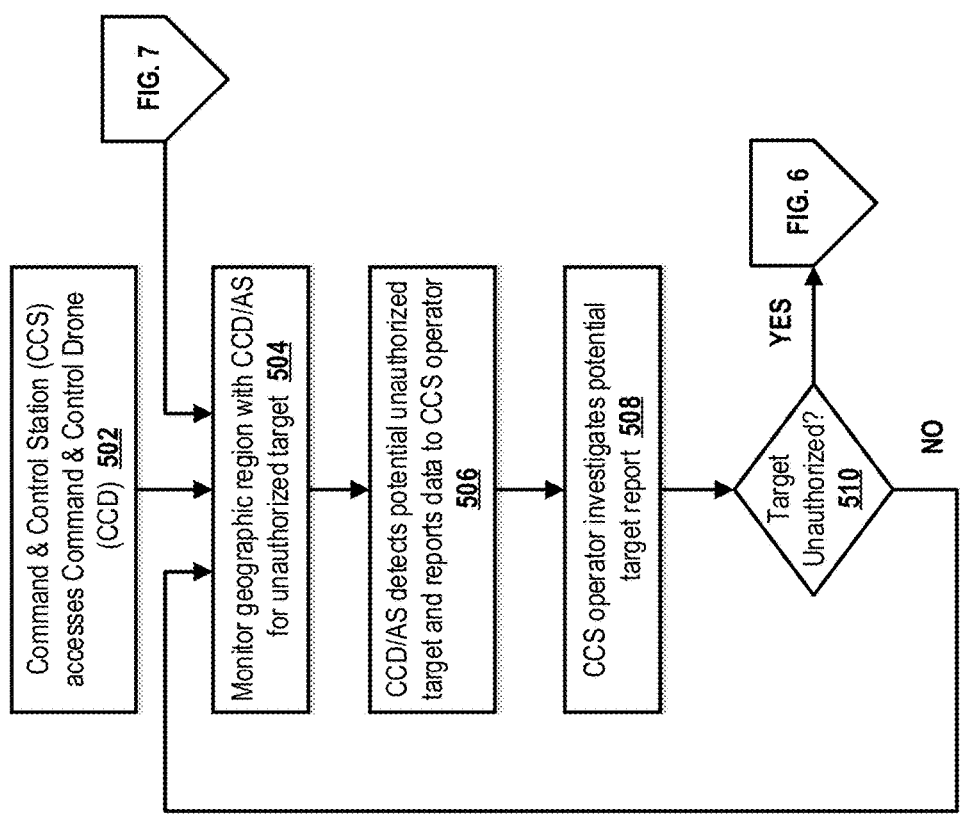
FIG. 5 is a flow chart of an example method for monitoring and detecting an unauthorized target using drone aircraft and sensors, according to an implementation.

FIG. 5 is a flow chart of an example method 500 for monitoring and detecting a target, according to an implementation. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At 502, a CCS operator launches a CCD drone or connects to a CCD drone in flight. From 502, method 500 proceeds to 504.

At 504, the CCS operator monitors a geographic region for an indication of an unauthorized target (for example, a person, vehicle, animal, and the like) using the CCD. Additionally, auxiliary sensors can feed data to the CCS or CCD to provide information on potential targets. In some implementations, a TD in a parked/sleep state can operate as an AS 108 or be configured to routinely activate, launch, and scan an area for potential targets before landing and returning to a parked/sleep state. From 504, method 500 proceeds to 506.

At 506, the CCD detects a potential unauthorized target and reports data to the CCS operator to notify the CCS operator of the potential target (for example, using a visual/audio indication). From 506, method 500 proceeds to 508.

At 508, the CCS operator investigates the potential target. For example, the CCS operator can use cameras on the CCD to photograph or visualize the potential target, query for an IFF transponder or friendly radio signal, and the like. From 508, method 500 proceeds to 510.

At 510, a determination is made as to whether the potential target is unauthorized. If it is determined that the potential target is unauthorized, method 500 proceeds to 602 in FIG. 6. If it is determined that the potential target is not unauthorized, method 500 proceeds back to 504.

Figure 6:
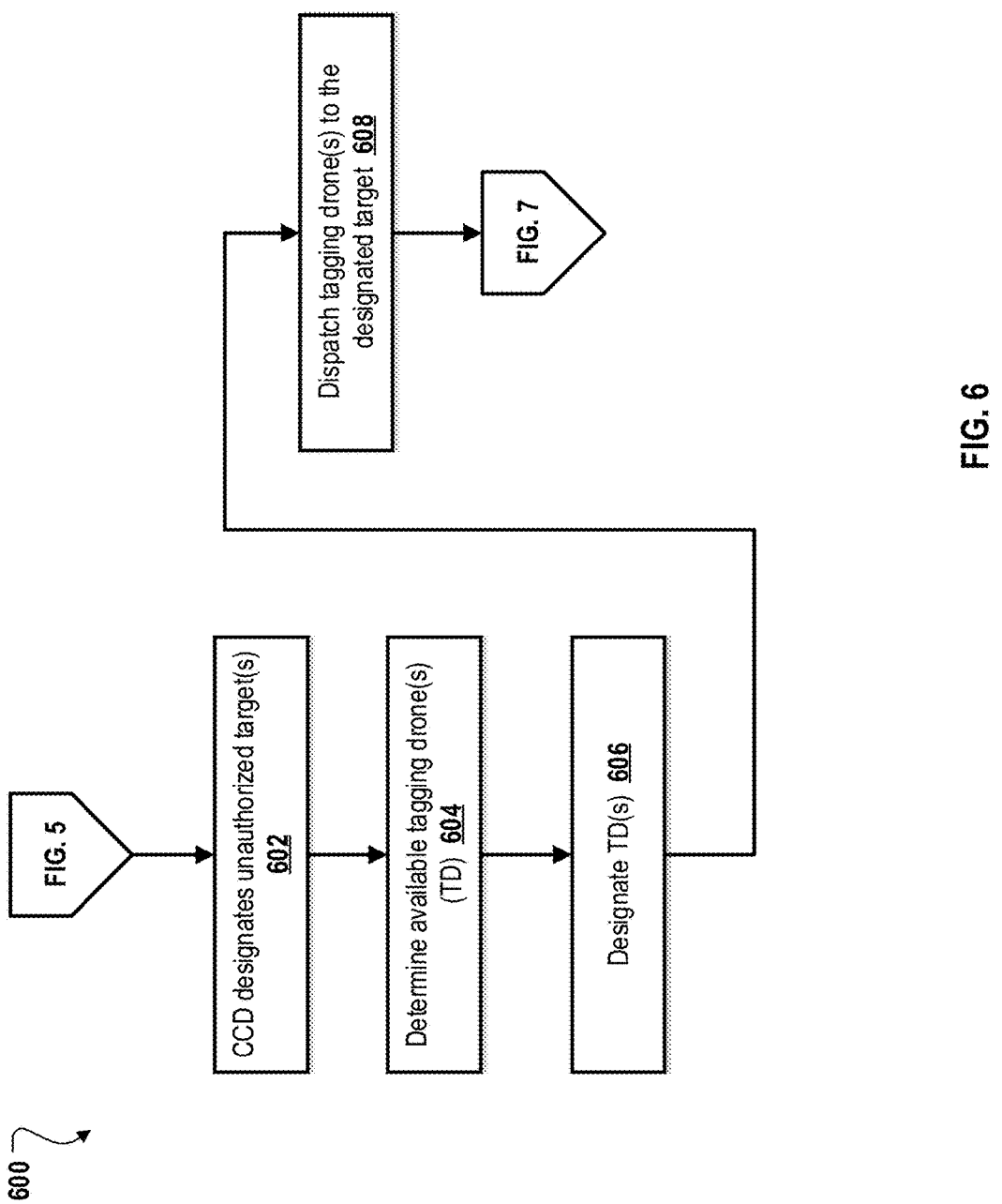
FIG. 6 is a flow chart of an example method for designating a target, monitoring, and dispatching a tagging drone to the designated target, according to an implementation.

FIG. 6 is a flow chart of an example method 600 for designating a target, monitoring, and dispatching a tagging drone to the designated target, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware, as appropriate. In some implementations, various steps of method 600 can be run in parallel, in combination, in loops, or in any order.

At 602, the CCD designates the unauthorized target (for example, using a visual lock, laser designation, and the like) under the direction of the CCS operator or in an automated manner. From 602, method 600 proceeds to 604.

At 604, the CCD determines (under the direction of the CCS operator or in an automated manner) available TDs to investigate/tag the determined unauthorized target. TDs can be uniquely identified and can respond to indicate availability for investigation/tagging operations (for example, using a radio response to a query) to indicate they are available. From 604, method 600 proceeds to 606.

At 606, one or more TDs are designated to investigate/tag the determined unauthorized target. Designation behavior can be set (for example, speed requirements, altitude requirements, number of responding tagging drones, and the like based, for example, on the determined type of unauthorized target, weather conditions, geography types, TD-configured tagging equipment type(s), and the like). From 606, method 600 proceeds to 608.

At 608, the designated TDs are dispatched to (for example, each TD receives one or more instructions to activate, launch, and vector toward) the determined unauthorized target (under the direction of the CCS operator or in an automated manner) and using data from various elements of system 100. Each TD can transmit a reply to the one or more instructions with a confirmation message and head to the determined unauthorized target. One or more of the designated TDs can optionally be used to provide a close-up/local view of a potential target. If the target is determined to be of no interest, authorized, or otherwise not in need of tagging, system 100 can cancel the targeting operation (for example, a CCS operator or automated determination by various components of system 100). From 606, method 600 proceeds to 702 in FIG. 7.

Figure 7:
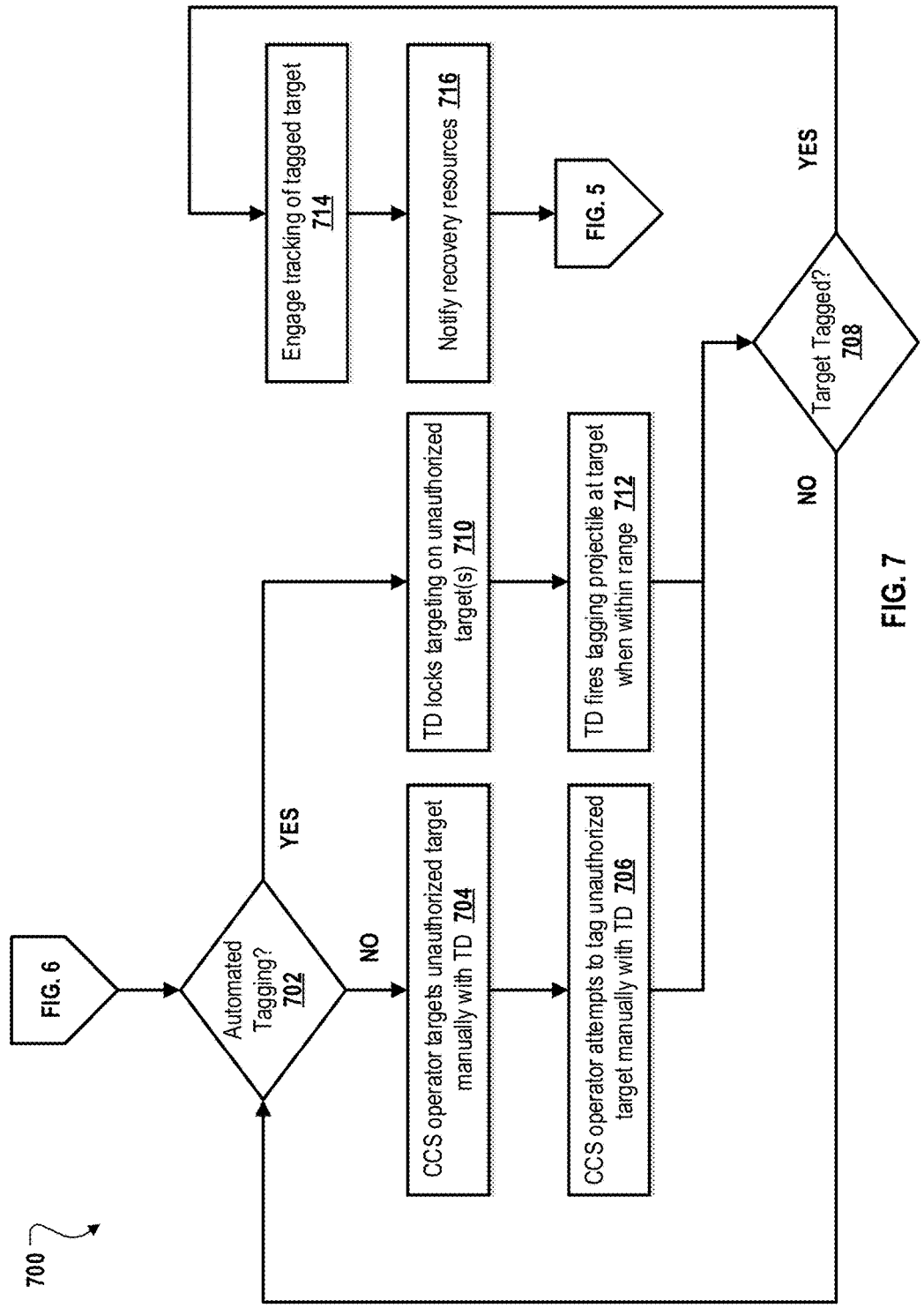
FIG. 7 is a flow chart of an example method for tagging, tracking, and notifying recovery resources with respect to a designated target, according to an implementation.

FIG. 7 is a flow chart of an example method 700 for tagging, tracking, and notifying recovery resources with respect to a designated target, according to an implementation. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order.

At 702, a determination is made as to whether automatic tagging of the unauthorized target should occur. If it is determined that automatic tagging should not occur, method 700 proceeds to 704. If it is determined that automatic tagging should occur, method 700 proceeds to 710.

At 704, the CCS operator targets the unauthorized target manually with the TD using the flight and tagging firing controls configured in the CCS. From 704, method 700 proceeds to 706.

At 706, the CCS operator attempts to tag the unauthorized target manually with the TD using the flight and tagging firing controls configured in the CCS (for example, by actuating a trigger on the tagging firing controls while targeting the unauthorized target to fire a tagging projectile). From 706, method 700 proceeds to 708.

At 708, a determination is made as to whether the unauthorized target was successfully tagged (for example, verifying the presence of a tagging substance on the unauthorized target). If it is determined that the unauthorized target was not successfully tagged, method 700 proceeds back to 702 to permit re-tagging of the unauthorized target. If it is determined that the unauthorized target was successfully tagged, method 700 proceeds to 714.

At 710, the TD automatically locks onto the unauthorized target. From 710, method 700 proceeds to 712.

At 712, the TD automatically attempts to tag the unauthorized target, for example, by firing a tagging projectile at the unauthorized target when within range of the TDs tagging equipment. From 712, method 700 proceeds to 708.

At 714, the tagged unauthorized target is tracked to permit recovery resources (for example, border patrol or other law enforcement) to intercept and capture the unauthorized target. For example, the TD or CCD can transmit data while tracking the unauthorized target for recovery resource use. From 714, method 700 proceeds to 716.

At 716, the system (for example, the CCS or an automated routine) notifies available recovery resources to intercept and capture the unauthorized target. From 716, method 700 proceeds back to 504 in FIG. 5.

Figure 8:
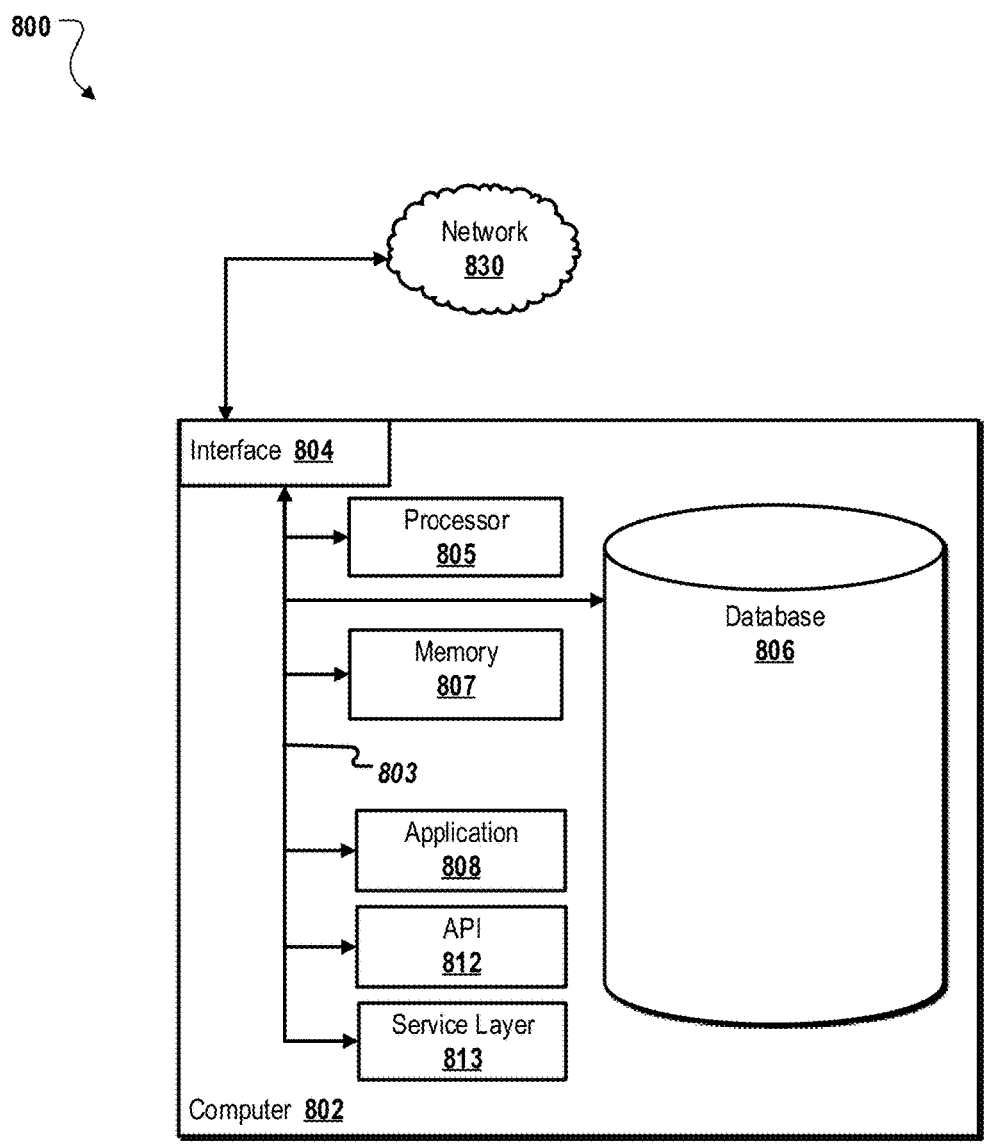
FIG. 8 is a block diagram of an exemplary computer system used to provide computational functionalities associated with described algorithms, methods, functions, processes, flows, and procedures as described in the instant disclosure, according to an implementation.

FIG. 8 is a block diagram of an exemplary computer system 800 used to provide computational functionalities associated with described algorithms, methods, functions, processes, flows, and procedures as described in the instant disclosure, according to an implementation. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, or other server (or a combination of servers).

The computer 802 can receive requests over network 830 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803, using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module, without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment, that are connected to the network 830 (whether illustrated or not). Generally, the interface 804 comprises logic encoded in software or hardware (or a combination of software and hardware) and operable to communicate with the network 830. More specifically, the interface 804 may comprise software supporting one or more communication protocols associated with communications such that the network 830, or the interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures, as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). For example, memory 807 can be random access memory (RAM), read-only memory (ROM), optical, magnetic, and the like, storing data consistent with this disclosure. In some implementations, memory 807 can be a combination of two or more different types of memory (for example, a combination of RAM and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, applications, etc. Further, although illustrated as a single application 808, the application 808 may be implemented as multiple applications 808 on the computer 802. In addition, although illustrated as integral to the computer 802, in alternative implementations, the application 808 can be external to the computer 802.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

As will be understood by those of ordinary skill in the art, the described functionality can also be used for other purposes. Examples include animal/insect migration, vegetation studies, crop conditions, weather conditions, etc.

Described implementations of the subject matter can include one or more features, alone or in combination.

For example, in a first implementation, a computer-implemented method, further comprising: responding to a received query of availability initiated from a command and control drone (CCD) or command and control station (CCS), over a network, for investigating or tagging a designated target; receiving one or more dispatching instructions to the designated target; heading to the designated target; performing tagging of the designated target; determining whether the designated target was successfully tagged as a tagged target; tracking the tagged target; providing tracking data for recovery resource capture of the tagged target.

The foregoing and other described implementations can each optionally include one or more of the following features:

A first feature, combinable with any of the following features, further comprising designating a tagging drone (TD) for investigating or tagging the designated target based on at least one of speed requirements, altitude requirements, designated target type, weather conditions, geography types, and TD-configured tagging equipment-type.

A second feature, combinable with any of the previous or following features, further comprising: transmitting a confirmation message to the CCD or CCS in response to the dispatching instructions; and activating, launching, and vectoring to the designated target.

A third feature, combinable with any of the previous or following features, further comprising investigating the designated target prior to tagging.

A fourth feature, combinable with any of the previous or following features, further comprising performing the tagging of the designated target while configured as part of a tagging drone (TD) swarming configuration.

A fifth feature, combinable with any of the previous or following features, further comprising: manually targeting the designated target from a command and control station (CCS); and manually initiating a tagging operation on the designated target from the CCS.

A sixth feature, combinable with any of the previous or following features, further comprising: automatically targeting the designated target; and automatically performing a tagging operation on the designated target.

In a second implementation, a non-transitory, computer-readable medium storing one or more instructions executable by a computer system to perform operations comprising: responding to a received query of availability initiated from a command and control drone (CCD) or command and control station (CCS), over a network, for investigating or tagging a designated target; receiving one or more dispatching instructions to the designated target; heading to the designated target; performing tagging of the designated target; determining whether the designated target was successfully tagged as a tagged target; tracking the tagged target; providing tracking data for recovery resource capture of the tagged target.

The foregoing and other described implementations can each optionally include one or more of the following features:

A first feature, combinable with any of the following features, further comprising one or more instructions to designate a tagging drone (TD) for investigating or tagging the designated target based on at least one of speed requirements, altitude requirements, designated target type, weather conditions, geography types, and TD-configured tagging equipment-type.

A second feature, combinable with any of the previous or following features, further comprising one or more instructions to: transmit a confirmation message to the CCD or CCS in response to the dispatching instructions; and activate, launch, and vector to the designated target.

A third feature, combinable with any of the previous or following features, further comprising one or more instructions to investigate the designated target prior to tagging.

A fourth feature, combinable with any of the previous or following features, further comprising one or more instructions to perform the tagging of the designated target while configured as part of a tagging drone (TD) swarming configuration.

A fifth feature, combinable with any of the previous or following features, further comprising one or more instructions to: manually target the designated target from a command and control station (CCS); and manually initiate a tagging operation on the designated target from the CCS.

A sixth feature, combinable with any of the previous or following features, further comprising one or more instructions to: automatically target the designated target; and automatically perform a tagging operation on the designated target.

In a third implementation, a computer-implemented system, comprising: a computer memory; and a hardware processor interoperably coupled with the computer memory and configured to perform operations comprising: responding to a received query of availability initiated from a command and control drone (CCD) or command and control station (CC S), over a network, for investigating or tagging a designated target; receiving one or more dispatching instructions to the designated target; heading to the designated target; performing tagging of the designated target; determining whether the designated target was successfully tagged as a tagged target; tracking the tagged target; providing tracking data for recovery resource capture of the tagged target.

The foregoing and other described implementations can each optionally include one or more of the following features:

A first feature, combinable with any of the following features, further configured to designate a tagging drone (TD) for investigating or tagging the designated target based on at least one of speed requirements, altitude requirements, designated target type, weather conditions, geography types, and TD-configured tagging equipment-type.

A second feature, combinable with any of the previous or following features, further configured to: transmit a confirmation message to the CCD or CCS in response to the dispatching instructions; and activate, launch, and vector to the designated target.

A third feature, combinable with any of the previous or following features, further configured to investigate the designated target prior to tagging.

A fourth feature, combinable with any of the previous or following features, further configured to perform the tagging of the designated target while configured as part of a tagging drone (TD) swarming configuration.

A fifth feature, combinable with any of the previous or following features, further configured to: manually target the designated target from a command and control station (CCS); and manually initiate a tagging operation on the designated target from the CCS.

A sixth feature, combinable with any of the previous or following features, further configured to: automatically target the designated target; and automatically perform a tagging operation on the designated target.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   as performed by a uniquely-identified tagging drone (TD):
      prior to activation:
         receiving a query of availability directed to the uniquely-identified TD;
         responding as available over a network to the received query of availability initiated from a command and control drone (CCD) or a command and control station (CCS); and
         receiving one or more dispatching instructions to a designated target;
      heading to the designated target;
      performing tagging of the designated target;
      determining whether the designated target was successfully tagged as a tagged target;
      tracking the tagged target; and
      providing tracking data for recovery resource capture of the tagged target.

2. The computer-implemented method of claim 1, further comprising designating the tagging drone for operations with respect to the designated target based on at least one of speed requirements, altitude requirements, designated target type, weather conditions, geography types, and TD-configured tagging equipment-type.

3. The computer-implemented method of claim 1, further comprising:
   transmitting a confirmation message to the CCD or CCS in response to the dispatching instructions; and
   activate and launch.

4. The computer-implemented method of claim 1, further comprising investigating the designated target prior to tagging of the designated target.

5. The computer-implemented method of claim 1, further comprising performing the tagging of the designated target while configured as part of a TD swarming configuration.

6. The computer-implemented method of claim 1, further comprising:
   manually targeting the designated target from the CCS; and
   manually initiating a tagging operation on the designated target from the CCS.

7. The computer-implemented method of claim 1, further comprising:
   automatically targeting the designated target; and
   automatically performing a tagging operation on the designated target.

8. A non-transitory, computer-readable medium storing one or more instructions executable by a computer system to perform operations comprising:
   as performed by a uniquely-identified tagging drone (TD):
      prior to activation:
         receiving a query of availability directed to the uniquely-identified TD;

responding as available over a network to the received query of availability initiated from a command and control drone (CCD) or a command and control station (CCS); and receiving one or more dispatching instructions to a designated target;

heading to the designated target;

performing tagging of the designated target;

determining whether the designated target was successfully tagged as a tagged target;

tracking the tagged target; and providing tracking data for recovery resource capture of the tagged target.

9. The non-transitory, computer-readable medium of claim 8, further comprising one or more instructions to designate the tagging drone for operations with respect to the designated target based on at least one of speed requirements, altitude requirements, designated target type, weather conditions, geography types, and TD-configured tagging equipment-type.

10. The non-transitory, computer-readable medium of claim 8, further comprising one or more instructions to:

transmit a confirmation message to the CCD or CCS in response to the dispatching instructions; and activate and launch.

11. The non-transitory, computer-readable medium of claim 8, further comprising one or more instructions to investigate the designated target prior to tagging of the designated target.

12. The non-transitory, computer-readable medium of claim 8, further comprising one or more instructions to perform the tagging of the designated target while configured as part of a TD swarming configuration.

13. The non-transitory, computer-readable medium of claim 8, further comprising one or more instructions to:

manually target the designated target from the CCS; and manually initiate a tagging operation on the designated target from the CCS.

14. The non-transitory, computer-readable medium of claim 8, further comprising one or more instructions to:

automatically target the designated target; and automatically perform a tagging operation on the designated target.

15. A computer-implemented system, comprising:

a hardware processor interoperably coupled with a computer memory and configured to perform operations comprising:

as performed by a uniquely-identified tagging drone (TD):

prior to activation:

receiving a query of availability directed to the uniquely-identified TD;

responding as available over a network to the received query of availability initiated from a command and control drone (CCD) or a command and control station (CCS); and receiving one or more dispatching instructions to a designated target;

heading to the designated target;

performing tagging of the designated target;

determining whether the designated target was successfully tagged as a tagged target;

tracking the tagged target; and providing tracking data for recovery resource capture of the tagged target.

16. The computer-implemented system of claim 15, further configured to designate the tagging drone for operations with respect to the designated target based on at least one of speed requirements, altitude requirements, designated target type, weather conditions, geography types, and TD-configured tagging equipment-type.

17. The computer-implemented system of claim 15, further configured to:

transmit a confirmation message to the CCD or CCS in response to the dispatching instructions; and activate and launch.

18. The computer-implemented system of claim 15, further configured to investigate the designated target prior to tagging of the designated target.

19. The computer-implemented system of claim 15, further configured to perform the tagging of the designated target while configured as part of a TD swarming configuration.

20. The computer-implemented system of claim 15, further configured to:

either:

manually target the designated target from the CCS; and manually initiate a tagging operation on the designated target from the CCS;

or:

automatically target the designated target; and automatically perform a tagging operation on the designated target.

* * * * *